United States Patent
Ainsworth et al.

(10) Patent No.: US 6,728,788 B1
(45) Date of Patent: Apr. 27, 2004

(54) METHOD AND SYSTEM FOR CONVERTING A REMOTE PROCEDURE CALL TO A LOCAL PROCEDURE CALL WHEN THE SERVICE IS ON THE SAME DEVICE AS THE CALLING CLIENT

(75) Inventors: Spencer James Ainsworth, Round Rock, TX (US); David Werner Bachmann, Leander, TX (US); Jayakumar Nagarajarao, West Orange, NJ (US); James Dean Wade, Austin, TX (US); Yi-Hsiu Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,842

(22) Filed: Dec. 16, 1999

(51) Int. Cl.[7] ................................................. G06F 9/46
(52) U.S. Cl. ....................................................... 709/330
(58) Field of Search ................................ 709/330, 310, 709/201, 202, 203

(56) References Cited

U.S. PATENT DOCUMENTS

| | | | | |
|---|---|---|---|---|
| 5,430,876 A | * | 7/1995 | Schreiber et al. ............ | 709/328 |
| 5,452,459 A | * | 9/1995 | Drury et al. .................... | 707/3 |
| 5,497,463 A | * | 3/1996 | Stein et al. .................. | 709/203 |
| 5,499,343 A | * | 3/1996 | Pettus ........................ | 709/203 |
| 5,511,197 A | * | 4/1996 | Hill et al. .................... | 709/328 |
| 5,526,491 A | * | 6/1996 | Wei ............................. | 709/330 |
| 5,682,534 A | | 10/1997 | Kapoor et al. .............. | 709/328 |
| 5,764,982 A | * | 6/1998 | Madduri ...................... | 709/330 |
| 5,778,228 A | * | 7/1998 | Wei ............................. | 709/328 |
| 5,787,281 A | * | 7/1998 | Schreiber et al. ........... | 709/328 |
| 6,249,822 B1 | * | 6/2001 | Kays et al. ................. | 709/330 |
| 6,289,391 B1 | * | 9/2001 | Smith et al. ................ | 709/312 |
| 6,393,497 B1 | * | 5/2002 | Arnold et al. .............. | 709/330 |
| 6,446,137 B1 | * | 9/2002 | Vasudevan et al. ......... | 709/330 |
| 6,487,607 B1 | * | 11/2002 | Wollrath et al. ............ | 709/330 |

* cited by examiner

*Primary Examiner*—John Follansbee
*Assistant Examiner*—Haresh Patel
(74) *Attorney, Agent, or Firm*—Duke W. Yee; Diana L. Roberts; Stephen R. Tkacs (57) ABSTRACT

A client process resides on a host computer within a distributed data processing system, and the client process requests a remote procedure call for a service procedure. A binding handle of a server process is obtained; a determination is made as to whether the binding handle of the server process points to the client process; and in response to a determination that the binding handle of the server process points to the client process, a positive indication is generated that the service procedure is provided by the client process. In response to a determination that the service procedure is provided by the client process, the service procedure is called using a local procedure call after obtaining a local address for the function within the client process by looking up the service procedure in an interface registry.

26 Claims, 4 Drawing Sheets

```
If (g_selfcall)
     CSPELL_selfcall(   fid,&BE_handle_info,p_interface,
                        p_operation, op_num, &comm_stat_info, &fault_stat_info);
```

FIG. 6B

```
CSPELL_manager_selfcall(   fid, P_interface, P_operation,
                           rep_as_handle_param,rep_as_type_name,
                           binding_handle_name);
```

FIG. 6C

```
/*SELFCALL START*/

TRY
selfcall = rpc_check_selfcall(   (rpc_binding_handle_t) handle,
                                 (rpc_if_handle_t) &IDL_ifspec,
                                 &IDL_mgr_epv);
if (selfcall)
{
    Rpc_binding_client_from_server(   (rpc_binding_handle_t) handle,
                                      (rpc_binding_handle_t) client_handle,
                                      &status);
    if (status = = error_status_ok)
    {
    /*this is the call to the manager code, which can be different for every interface */
    (*((intf1_v2_0_epv_t*)IDL_mgr_epv)->function1)(client_handle,parm1,parm2);
    }
    else selfcall = FALSE;
}
CATCH_ALL
if (exc_get_status_(THIS_CATCH,&IDL-ms.IDL_status)1=error_status_ok)
     IDL_ms.IDL_status=rpc_s_fault_unspec;
ENDTRY
if (client_handle) rpc_binding_free(client_handle,&status);
if (self_call) gotoIDL_closedown;

/*SELFCALLEND*/
```

METHOD AND SYSTEM FOR CONVERTING A REMOTE PROCEDURE CALL TO A LOCAL PROCEDURE CALL WHEN THE SERVICE IS ON THE SAME DEVICE AS THE CALLING CLIENT

BACKGROUND OF THE INVENTION

1. Technical Field

The present invention relates generally to an improved data processing system and, in particular, to a method and apparatus for interprocess or intraprocess communication, specifically remote procedure calling.

2. Description of Related Art

It is known in the art to interconnect multiple computers into a local area network (LAN) to enable such computers to exchange information and share resources. A local area network provides a distributed computing environment in which users can access distributed resources and process applications on multiple computers. Network communications are carried out using so-called communication protocols. By convention, communication architectures in a local area network are typically characterized as conforming to a seven layer model in the following hierarchy: physical layer, logical link layer, network layer, transport layer, session layer, presentation layer and application layer. The physical layer comprises the actual physical devices and medium used to transmit information. The logical link layer frames data packets and controls physical layer data flow, insuring delivery of data regardless of the actual physical medium. The network layer addresses and routes data packets. It creates and maintains a route in the network between a source node and a destination node. The transport layer creates a transport pipeline between nodes and manages the network layer connections. The session layer typically provides remote procedure call (RPC) support, maintains the integrity of the connection between nodes and controls data exchange. The presentation layer encodes and decodes data and provides transparency between nodes. Finally, the application layer provides the interface to end-user processes and provides standardized services to applications.

The seven layer model has many variations depending on the particular network architecture. Thus, for example, in a network architecture based on the TCP/IP (Transmission Control Protocol/Internet Protocol) interface running IBM RISC System/6000™ computer workstations under the AIX Operating System, there is another layer, called the socket layer, that sits between the session and transport layers. The socket layer creates so-called "sockets" which are logical constructs analogous to physical ports. In this architecture, the RPC mechanism is not just supported in the session layer, but also includes functionality of the session layer.

Remote procedure call is the foundation of modern client-server based distributed systems. One well-known distributed system that uses RPC as the basic communication mechanism is Microsoft's DCOM (Distributed Component Object Model). The best-known application using RPC in the Unix world is Sun's NFS (Network File System), which is based on their ONC (Open Network Computing) RPC. In addition, most of the ORB (Object Request Broker) implementations of the OMG's (Object Management Group) CORBA (Common Object Request Broker Architecture) specifications build their remote method calls for object communications on top of a variation of RPC. The Java RMI (Remote Method Invocation) is another variation of the RPC technology.

A known RPC mechanism useful in Distributed Computing Environments (DCE) includes software code provided by the Open Systems Foundation (OSF). The OSF DCE RPC mechanism is used conventionally to manage communication between a "client" and a "server" in a distributed computing environment, with the client requesting a service from a server using a remote procedure call (RPC). A "client" refers to a network participant that is requesting a service accessible somewhere within the computing environment. A "server" provides the requested service to a client. With the OSF DCE RPC mechanism, each client process (namely, a process running on a client machine) has an associated socket created by the socket layer. Each server process likewise is associated with a socket. In response to an RPC, a call directory service returns a data structure, called a "binding handle," specifying the location of the server process as a network address and the port number where the server process is running. The binding handle is then used by the RPC mechanism to define a communication path between the client process and the server process. The path is defined using IP-based (i.e., network layer) protocol sequences of the Internet Network Address Family (AF_INET) to open the sockets. The path loops down from the client process through the transport and network layers, out on the network and then back up the layers associated with the host on which the server process is running.

Due to its role in distributed processing, RPC is a key factor in the overall performance of a distributed system. There have been various techniques proposed and implemented to improve RPC performance. For example, RPC stubs on both the client side and the server side require a large amount of memory space and large storage space. In U.S. Pat. No. 5,778,228, "Method and System for Transferring Remote Procedure Calls and Responses Over a Network", a method is disclosed for optimizing the RPC stub routines so as to significantly reduce their impact on system memory and mass storage.

As another example of the need for RPC optimization, the OSF DCE RPC mechanism as described above cannot distinguish whether client and server processes are running on the same host machine. In all cases, the mechanism returns a binding handle to the client process including an AF_INET protocol sequence that sets up a communication path through the transport (TCP or UDP) layer and the network (IP) layer. Communications through TCP use connection-oriented protocol sequences while those through UDP use connectionless protocol sequences. But in either case, when the client and server processes reside on the same host, an RPC generates a so-called loopback message because once the network (IP) layer receives the destination network address, it recognizes that the RPC is "local"; the path must therefore be looped back up through the transport layer to the server process on the applications layer. Because of this loopback requirement, RPCs between client and server processes on the same machine are not optimized from a performance standpoint as they use the transport and network layers unnecessarily.

In U.S. Pat. No. 5,682,534, "Transparent Local RPC Optimization", a method is disclosed for bypassing heavy-weight transport stack operations using local sockets for interprocess calls on the same machine. However, this method still incurs a significant amount of processing overhead for local socket operations and for parameter marshalling and unmarshalling.

Therefore, it would be advantageous to have an improved method and system for optimizing RPCs by completely bypassing RPC setup when possible.

SUMMARY OF THE INVENTION

A method and system for optimizing remote procedure calls by converting the remote procedure call to a local procedure call is provided. A client process resides on a host computer within a distributed data processing system, and the client process requests a remote procedure call for a service procedure. A determination is made as to whether the service procedure is provided by the client process in the following manner: a binding handle of a server process for the service procedure is obtained; a determination is made as to whether the binding handle of the server process points to the client process; and in response to a determination that the binding handle of the server process points to the client process, a positive indication is generated that the service procedure is provided by the client process. In response to a determination that the service procedure is provided by the client process, the service procedure is called using a local procedure call after obtaining a local address for the function within the client process by looking up the service procedure in an interface registry. The conversion of the remote procedure call to a local procedure call is performed within client stub code for the service procedure within the client process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Distributed Computing Environment

Figure 1:
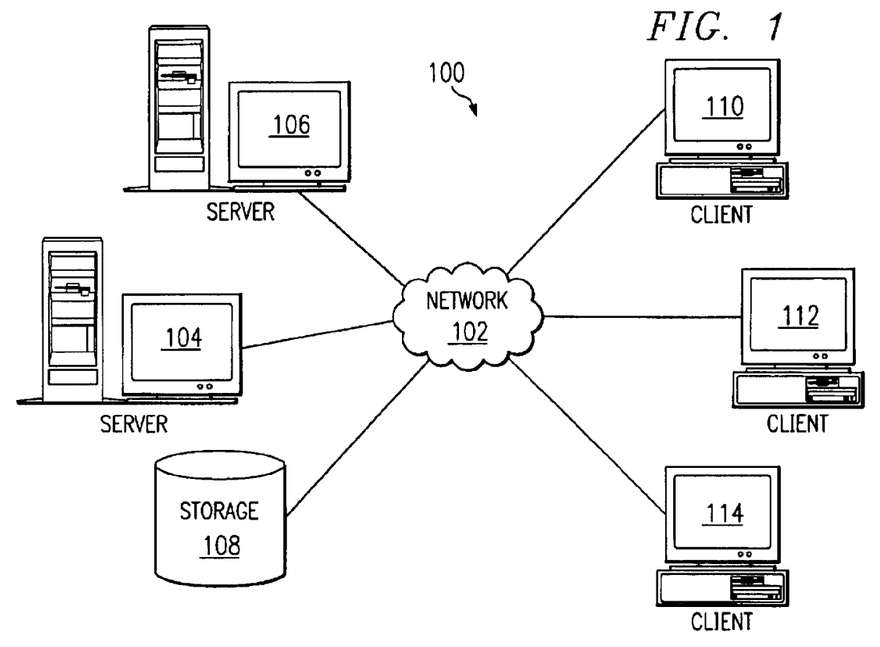
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 and server 106 is connected to network 102 along with storage unit 108. In addition, clients 110, 112, and 114 also are connected to network 102. These clients 110, 112, and 114 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 110–114.

Clients 110, 112, and 114 are clients to server 104. Additionally, clients 110–114 also may be clients to server 106 in these examples. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an intranet, a local area network (LAN), or a wide area network (WAN).

FIG. 1 is intended as an example and not as an architectural limitation for the present invention. The present invention is applicable to all client-server distributed systems which use remote procedure calls or a variation of remote procedure call as a foundation for communications among clients and servers.

Hardware Platform Description

Figure 2:
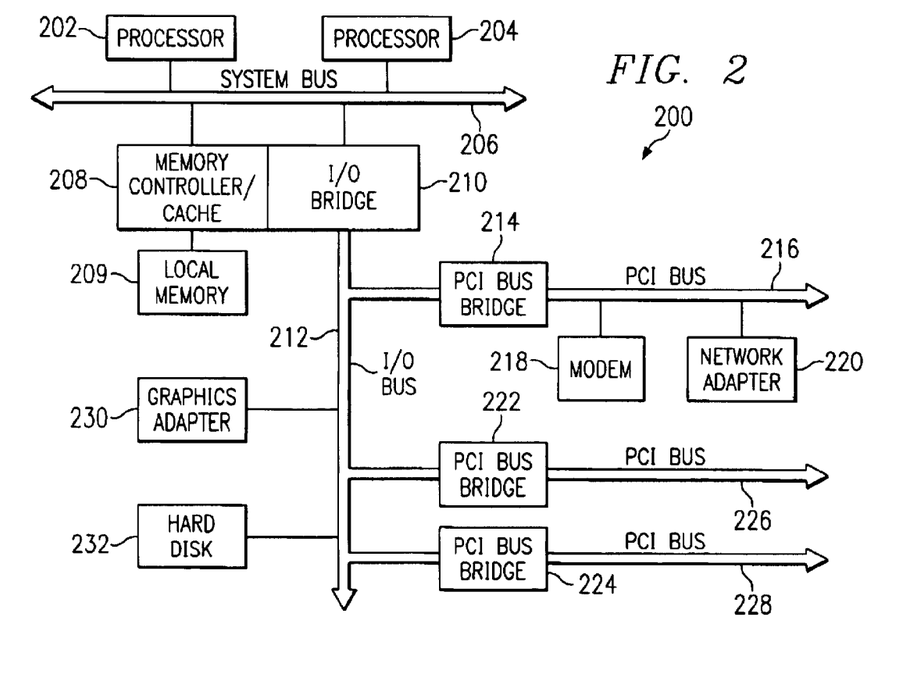
FIG. 2 is a block diagram depicting a data processing system that may be implemented as a server.

With reference now to FIG. 2, a block diagram depicting a data processing system that may be implemented as a server, such as server 104 or server 106 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000™ system, a product of International Business Machines Corporation in Armonk, N.Y., running the Advanced Interactive Executive (AIX™) operating system.

Remote Procedure Call (RPC) Description

In the modern world of networked, heterogeneous computing systems, the task of communications between clients and servers is quitelcomplex. There are a variety of protocols for registering service requests. One of the most widely used techniques is a remote procedure call (RPC).

Figure 3:
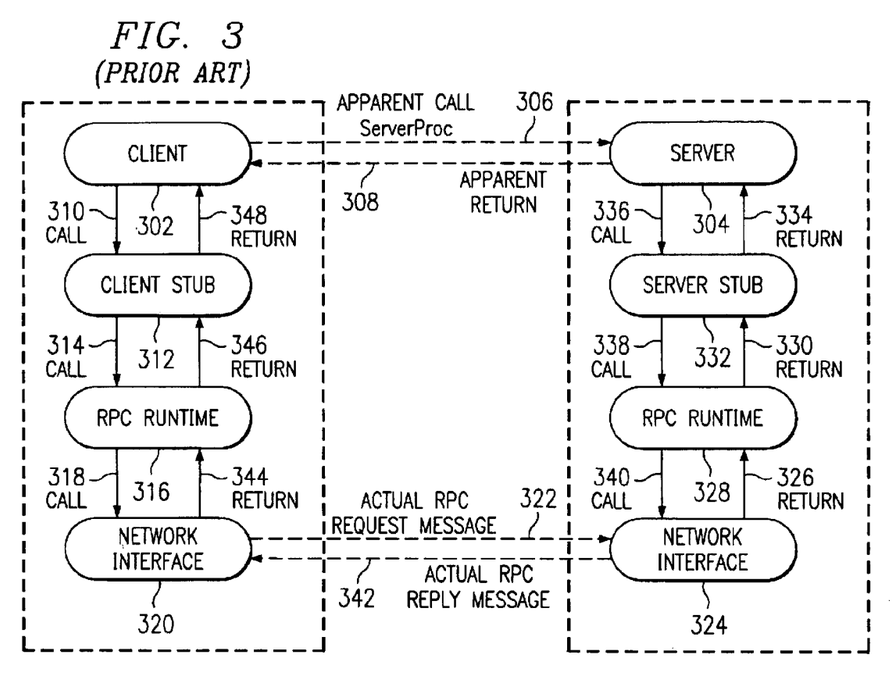
FIG. 3 is a block diagram depicting the apparent communications provided by an exemplary remote procedure call in terms of the actual communication that occurs between the client and the server.
Figure 4:
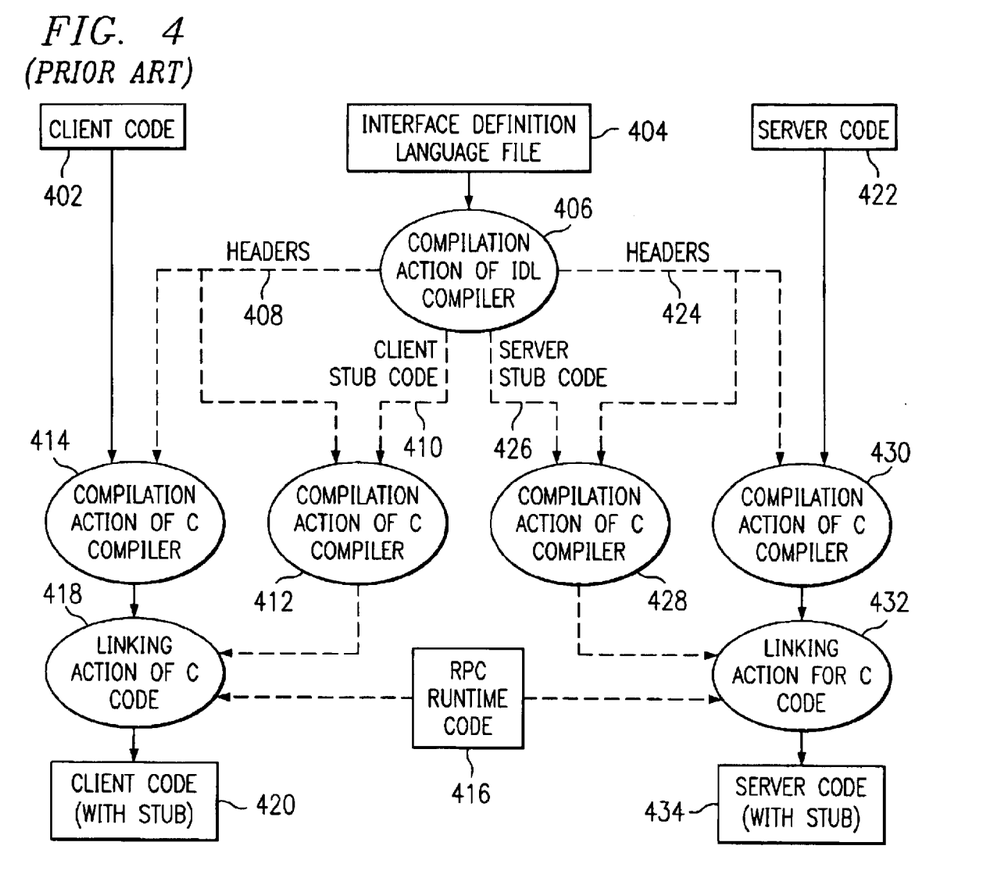
FIG. 4 depicts actions within a typical IDL compilation environment.

FIG. 3 and FIG. 4 provide background information for an example RPC mechanism. A DCE client application imports one or more RPC interfaces. The client accesses the server services by making RPCs on the operations defined in the RPC interface exported by the server. An IDL compiler generates client stub routines and server stub routines to process data for the remote procedure call operations. A stub routine is a program module that transfers remote procedure calls and responses between a client and a server.

With reference now to FIG. 3, a block diagram depicts the apparent communications provided by an exemplary remote procedure call in terms of the actual communication that occurs between the client and the server. The client processes are shown on the left side of the figure, and the server processes are shown on the right side of the figure.

In the apparent communication paths of a remote procedure call, client 302 requests a service from server 304 via a call to service procedure 306. Server 304 carries out the invoked procedure and returns result 308 to client 302.

Assuming the client and server are on different machines, the actual communications process during a remote procedure call is more complex. Client 302 makes call 310 to client stub 312 requesting the service to be performed. Client stub 312 marshalls the parameters for the call, that is, assembles the parameters into the proper format, and client stub 312 makes call 314 to RPC runtime procedure 316. This results in RPC runtime procedure 316 making call 318 to Network interface 320, which sends an RPC request message via some network protocol. Network interface 324 on the server, in turn, passes the request to RPC runtime procedure 328 via return 326. RPC runtime procedure 328 passes the request on to server stub 332 via return 330, which unmarshalls the parameters and passes the request to server 304 via return 334. Server 304 now carries out the requested action.

The result is returned to the client by reversing the entire process. In particular, server 304 makes call 336 to server stub 332 to return the result. Server stub 332 marshalls the parameters and makes call 338 to RPC runtime procedure 328. This results in RPC runtime procedure 328 making call 340 to network interface 324. It is network interface 324 that sends the actual reply message 342 to network interface 320 on the client, which, in turn, passes the reply to RPC runtime procedure 316 via return 344. RPC runtime procedure 316 passes the reply on to client stub 312 via return 346, which unmarshalls the parameters and passes the reply to client 302 via return 348. Client 302 now has the result of the requested action.

The Interface Definition Language (IDL) is used to specify client-server interfaces in a language independent fashion. There is an IDL compiler that translates this language independent specification into an actual target language on a particular server machine. To understand how RPC optimization is accomplished, it is necessary to review the compilation steps necessary to produce the client runtime code and the server runtime code.

With reference now to FIG. 4, actions within a typical IDL compilation environment are depicted. The generation of the client runtime code is discussed first. Client source code 402 needs to know about the client-server interface and the runtime code for the remote procedure call. The client-server interface is specified in Interface Definition Language File 404. IDL compilation action 406 opens IDL file 404 and translates the specification into the target language. In FIG. 4, the target language C is shown, so header files 408 and client stub source code 410 are produced. Compilation action 412 combines client stub source code 404 and headers 408. Compilation action 414 combines client source code 402 and headers 408. Linking action 418 combines RPC runtime source code 416 with the results of compilation action 412 and compilation 414 to produce client runtime code 420.

The server runtime code is produced in a manner similar to the client runtime code. Specifically, IDL compiler 406 uses IDL file 404 to produce server stub source code 426 and header files 424. Compilation action 430 combines server source code 422 with header files 424. Compilation action 428 combines server stub source code 426 with header files 424. The results of compilation actions 428 and 430 are then combined with RPC runtime source code 416 by linking action 432 to produce server runtime code 434.

As one of ordinary skill in the art will appreciate, the compilation steps shown in FIG. 4 using C could easily be adapted to use other languages, such as C++ or Java. The client code and server code produced by this compilation process contain all the overhead necessary to run in a distributed environment with the client and server on different machines. As one of ordinary skill in the art will appreciate, there is a great deal of overhead processing that is needed to give the appearance that a client can request a service from a server and receive a reply from the request. This entire chain of events is necessary when the client and server are on different machines in a distributed computing environment.

When processing requests in modularized distributed systems, such as process-based software (e.g., DCE applications), object-based software (e.g., ORB applications), or component-based software (e.g., Enterprise Java Beans or EJBs), a software module may invoke a service that is actually provided by itself. This situation causes a call to a service exported from itself. The DCE Security server frequently does such self-service requests.

If the client and the server are on the same machine, then an ordinary procedure call could accomplish the same result as the remote procedure call mechanism. The key idea of this invention is to recognize when the client and server are on the same machine and running as part of the same process. In this invention, the compilation process is altered so that the code produced for the client and the server uses an ordinary procedure call in place of a remote procedure call if the client and server are on the same machine.

Selfcall Technique

The present invention introduces an RPC optimization scheme called "selfcall" that will completely bypass the RPC parameter marshalling/unmarshalling and the transport stack altogether for those RPCs that qualify. A selfcall can occur when an RPC is to be made to a service provided by the same server in which the RPC caller resides. This condition is seen in core infrastructure servers such as the DCE's security server. The selfcall techniques can be applicable to all variations of RPC including remote object invocations in ORBs, Java RMI, and the MS DCOM processing. Rather than performing a remote procedure call, the caller can turn around to invoke the procedure directly via the normal procedure call mechanism instead of RPC. Beyond by-passing the transport stack, the selfcall mechanism further ensures that for self-service requests, the upper layer RPC processing, including parameter marshalling/unmarshalling and RPC call setup, can be bypassed altogether to yield significant optimization.

Correctness Conditions for Selfcall Implementation

In order to ensure correct execution behavior, the following description provides a discussion of program correctness upon substituting a local procedure call for an RPC, as provided by the selfcall mechanism of the present invention.

A question may be asked at an abstract level: whether the semantics of an application are maintained after switching from an RPC to a local procedure call that invokes the same routine. This subtle question requires a clear understanding of how RPCs and local calls are different. Although RPC is known to have implemented a maximum local-remote transparency, it is not semantically completely identical to a local call.

The differences in an RPC and a local call lie in the memory management of the RPC client and the RPC server due to the inevitable physical separation of the two address spaces. In RPC, there could be actual duplication of parameters in the client process heaps and in the server process heap, whereas in a local procedure call, there is only one copy of the parameters. This difference warrants a detailed analysis.

1. Input Scalar Data

For RPC, a copy of the scalar is created in the procedure stack. The copy is consumed and discarded at the return of the call. The RPC and local call have the same semantics in this scenario.

2. Output Reference Parameters

For the local call the memory is allocated by the procedure, and pointers to the memory are returned to the caller.

For RPC, this means that the procedure will allocate parameter memory from the server process heap and the references to these parameters are returned to the client. The RPC mechanism accomplishes a local-remote transparency successfully in this case: the parameters are marshalled (and copied) into linear buffers, and the parameter memory and the buffers are deallocated after the buffers are sent back to the client via transport. Upon receiving the output parameters, the client RPC stub allocates the parameter memory from the client process heap and copies the parameter values from the transport buffers. This demonstrates the same behavior as the local procedure call.

3. Input-and-output Reference Parameters

In this case, the RPC client has an input parameter that points to structures in the client process heap. The parameter is passed in the call to the procedure and also returned from the call. In local procedure calls, the same memory is passed over to the procedure and passed back, with the possibility of being altered by references to the substructures by the procedure. The RPC mechanism implements local-remote transparency well in this case, where the output parameter as changed at the return of the procedure will reflect correctly at the client via the work of both the client and the server stubs.

4. Input-only Reference Parameters

This is a case where the local-remote transparency may be broken if the server procedure alters the input parameters. In RPC, input-only reference parameters will not be returned from the server: the changes, if any, made by the procedure will not be seen at the client. In a local procedure call, the changes made to the reference parameters are always visible to the clients.

5. Procedure With State

If the procedure contains static local variables whose state survives across calls, the persistent variables will behave the same in both RPC and local procedure calls.

6. Procedure Allocated Persistent Server State in the Server Heap

In the local case, the persistent memory that the procedure allocates and references as global state is visible to the callers. However, since the references to the memory are not passed back via parameters, the caller programs will normally not be touched by the callers unless via global variable reference. This scenario does not occur in a native RPC application. So when the RPC is replaced with a local procedure call, there is no problem associated with global variable access.

Hence, from this analysis, item #4 above is a condition that may cause program semantics to change when replacing an RPC with a local procedure call. This problem is resolved by one of two methods: (A) interface checking and (B) enforcing a programming rule.

A. Interface Checking and Auto-switching

The switching logic can detect the condition from the interface definitions prior to switching to local calls from RPCs. If the procedure contains an input "[in]" parameter which is a pointer to a structure, the optimization will not be carried out. In this case, the RPC will be made.

B. Enforcing a Programming Rule

It is not good programming practice for the procedure to modify the structure that an "[in]" parameter points to knowing that the parameter will not be returned to the client. The only reason for doing so may be to use the structure a temporary area when processing the data. This practice will cause programming errors for local procedures when the parameters are not expected to be changed by the procedure. If a programming rule ensures no remote procedures will modify any non-scalar "[in]" parameters, the selfcall optimization can be realized in all situations without risking a change in program semantics.

General Implementation of Selfcall

Figure 5A:
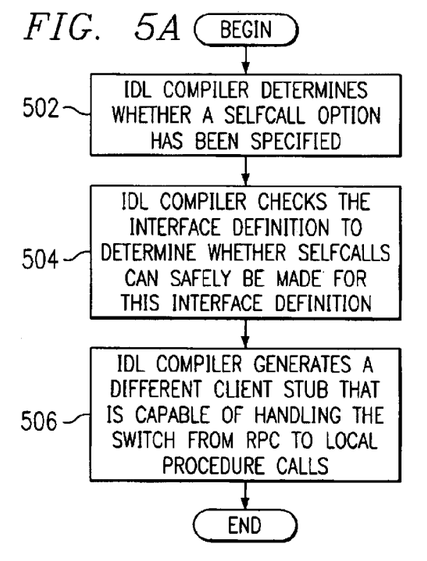
FIG. 5A is a flowchart depicting a process for generating code for the selfcall mechanism during IDL compilation in accordance with a preferred embodiment of the present invention.

With reference now to FIG. 5A, a flowchart depicts a process for generating code for the selfcall mechanism during IDL compilation in accordance with a preferred embodiment of the present invention. The process begins with the IDL compiler determining that a selfcall option has been specified by a user requesting the generation of selfcall code when possible (step 502). The IDL compiler detects appropriate conditions for ensuring correct behavior of a selfcall implementation with respect to the interface description, i.e., determines whether selfcalls can safely be made for a particular interface definition (step 504). The IDL compiler then generates a different client stub that is capable of switching the calls from RPC to local calls (step 506).

Figure 5B:
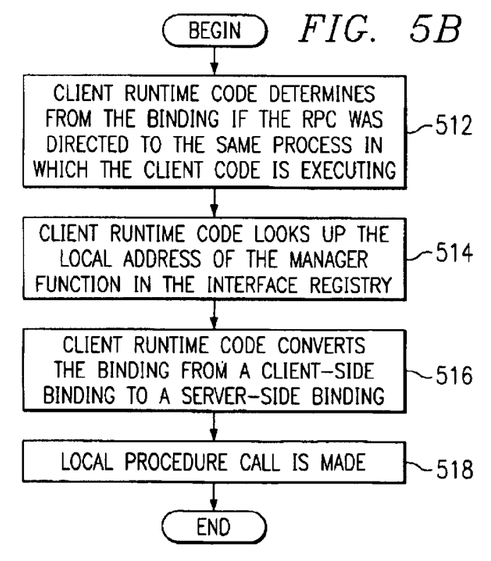
FIG. 5B is a flowchart depicting a process for executing code in the client process that is capable of implementing the selfcall mechanism in accordance with a preferred embodiment of the present invention.
Figure 5C:
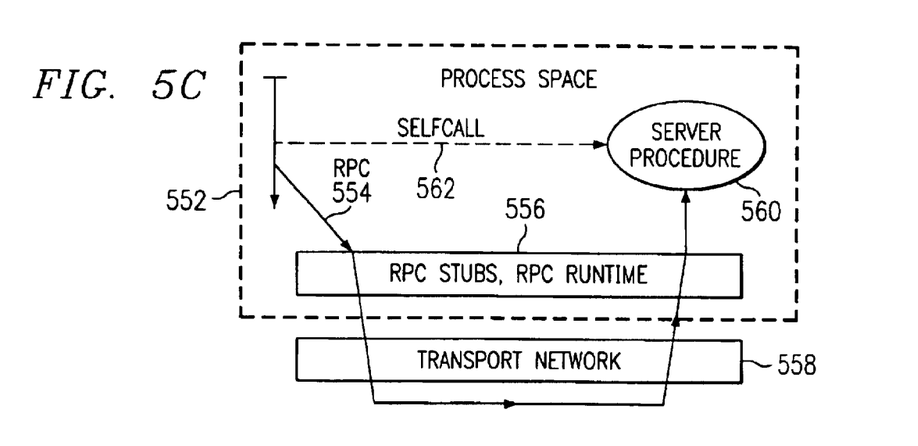
FIG. 5C is a block diagram depicting a conversion of a remote procedure call to a local procedure call within a single process space.

With reference now to FIG. 5B, a flowchart depicts a process for executing code in the client process that is capable of implementing the selfcall mechanism in accordance with a preferred embodiment of the present invention. FIG. 5C depicts a method at client runtime in which a client process executes code that has been previously generated using a process similar to that depicted in FIG. 5B.

At runtime, the client code determines from the binding if the current RPC call is directed to the same process in which the client code is running (step 512). If the call is directed to the same process, the client code then performs a lookup in the interface registry to get the local address of the manager function (step 514). The client code then converts the binding from a client-side binding to a server-side binding (step 516), and the local procedure call is made (step 518). This step may need to be performed only once on the first call, with subsequent calls using the converted binding obtained in the first call. If necessary, an authentication process may be bypassed.

With reference now to FIG. 5C, a block diagram depicts a conversion of a remote procedure call to a local procedure call within a single process space. Process space 552 contains procedures on particular execution paths. At some point, a routine or function may invoke remote procedure call 554. A normal RPC call passes through RPC stubs/RPC runtime code 556 and through network transport code 558 to reach server procedure 560. However, since the server procedure that is the subject of the RPC is in the same process space as the routine that originates the RPC, the present invention may convert the RPC, in certain circumstances, into local procedure call 562 via the selfcall mechanism.

Identified Inefficiencies/problems With RPC in DCE

One of the features of DCE is location transparency. An application server can be located on any host in the network. An application client does not need to know the location of the application server beforehand. The directory service can provide the location of an appropriate server, and RPC will deliver the call to that server.

RPC calls can be made from processes that are RPC servers, either from client threads or from manager code running within an executor thread as a result of the server receiving a client call. The RPC call can sometimes result in a call to the same server process. Hence, a first problem exists in that, under normal RPC processing, the client code does not know or care about the location of the server, and a call is made remotely, wasting resources and time.

A second problem is that deadlocks can occur if there is a limited number of executor threads to handle RPCs. When the manager code handling an RPC in an RPC server makes a second RPC directed to itself, i.e. to the same server process, both RPCs will use an RPC executor thread in that server process. If all executor threads are busy, the second call will have to wait. If all executor threads are doing this same thing, i.e., are executing manager code that has made a second RPC call to the same server, then a deadlock condition has occurred since processes are waiting for executor threads that will never become available.

Technical Implementation of Selfcall in DCE

As discussed previously, remote procedure calls are implemented in a variety of manners and distributed computing environments, and the selfcall mechanism of the present invention is applicable to all client-server distributed systems which use remote procedure calls or a variation of remote procedure call as a foundation for communications among clients and servers. The following description provides implementation details for the selfcall mechanism of the present invention within one particular distributed computing model, DCE.

To enhance performance by avoiding the use of the transport layer as well as the use of another executor thread, a process should be able to call the function directly as a local procedure call. If the function is there in the same process, it should be able to call it directly and avoid use of another executor thread.

The present invention recognizes that it would be more efficient to make a local procedure call when the procedure is in the same process by making changes to the client stub as follows. First, it must be determined from the binding if the current call was directed at this same process. If so, then the call is made locally. The interface registry is examined to get the address of the procedure. The parameters for the procedure are then passed to the procedure as they were passed into the client stub. In addition, the binding handle must be converted from a client-side binding to a server-side binding since that is the way it would have been received in an RPC.

In order to implement the selfcall mechanism of the present invention within DCE, three changes would be made to the IDL compiler to support selfcall. The first change provides a new, user-specifiable option that indicates whether selfcall code should be generated. Rather than always incorporating code that may switch RPCs to local calls, there may be times when a software developer does not want to take advantage of converting RPCs to local procedure calls, e.g., in particular software testing environments. Hence, the user may specify an option for generating selfcall code via a new command line option flag, an option in a configuration file, etc. The IDL compiler accepts the option and stores the user preference in its option table along with other user-specifiable options.

A second modification that would be required within an IDL compiler is the addition of a function to the code generator of the IDL compiler to generate the code to check whether selfcall is supported. The code generated by this function is the same for any interface definition.

A third modification that would be required within an IDL compiler to support the selfcall functionality of the present invention is the addition of a function to the code generator of the IDL compiler to generate the code to call the manager interface. The code generated by this function is different for each interface definition. The "manager" code or function is the function or procedure that is the target of the original RPC call by the client process, whether or not the manager function actually resides within the process that originates the RPC or resides within a server process elsewhere on the network.

Figure 6A:
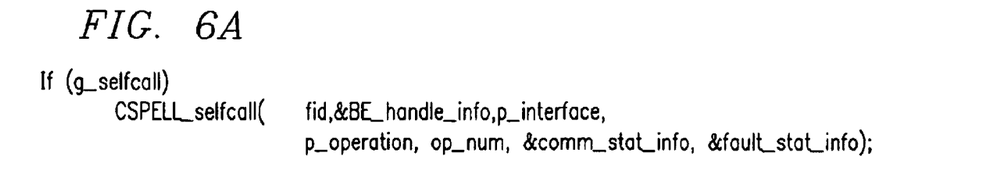
FIG. 6A is a source code statement depicting a routine within the IDL compiler that has been enhanced to accept a selfcall option and generate the code to check whether selfcall is supported in accordance with a preferred embodiment of the present invention.

With reference now to FIG. 6A, a source code statement depicts a routine within the IDL compiler that has been enhanced to generate the code to check whether selfcall can be supported for a particular interface in accordance with a preferred embodiment of the present invention.

As a preliminary step, the user has specified the desire to generate selfcall code. This may be achieved, for example, by allowing a user to specify a command line option parameter for selfcalls. The command line parser would have been modified to accept the selfcall option, which is then stored in the option table of the IDL compiler.

When this option has been specified, a global flag would be set within the IDL compiler, such as "g_selfcall" shown in FIG. 6A. The code generator of a standard IDL compiler has been modified so that when this flag is set, the IDL compiler will generate additional code in the client stub just before the call to "rpc_call_start", which is a standard function known to those skilled in the art. For example, the function "CSPELL_client_stub_routine( )" in the code generator of the IDL compiler, also known to those skilled in the art, is modified to include a statement similar to that shown in FIG. 6A. The statement shows a check of the flag "g_selfcall" that reflects the selection by the user of the selfcall option in the IDL compiler. If the flag is set, then the function "CSPELL_selfcall" is called.

The "CSPELL_selfcall" function shown in FIG. 6A implements the second modification to the IDL compiler mentioned above. The "CSPELL_selfcall( )" function generates the code which checks whether the RPC call can be handled locally, and if so, then this code calls the manager code directly. The call to the manager code is different for every interface. The call to the manager code is achieved by the function "CSPELL_manager selfcall( )", as shown in FIG. 6B, which is called from the "CSPELL_selfcall( )".

Figure 6B:
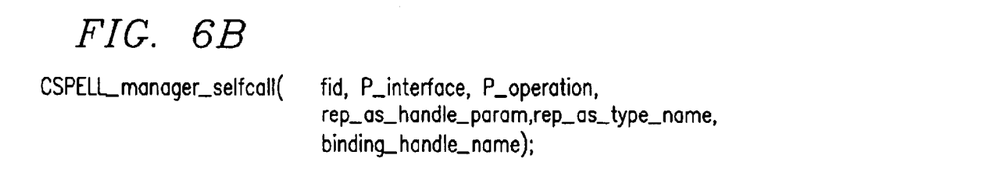
FIG. 6B is a source code statement depicting a routine within the IDL compiler that has been enhanced to generate the code to make the manager function call in accordance with a preferred embodiment of the present invention.

With reference now to FIG. 6B, a source code statement depicts a routine within the IDL compiler that has been enhanced to generate the code to make the manager function call in accordance with a preferred embodiment of the present invention. The "CSPELL_manager selfcall( )" function generates the code that uses the IDL_mgr_epv (entry point vector) to make the function call as it would be done in the server stub of this manager code during a standard RPC. The parameters passed to this function are the parameters that are passed to the client stub. Hence, it should be noted that it behaves as a true local procedure call, i.e., when the results are updated by the manager routine, the changes are made at the original address of the result parameters, while in a normal RPC the results are copied to the original address as a part of unmarshalling. As a result, the performance is enhanced.

Figure 6C:
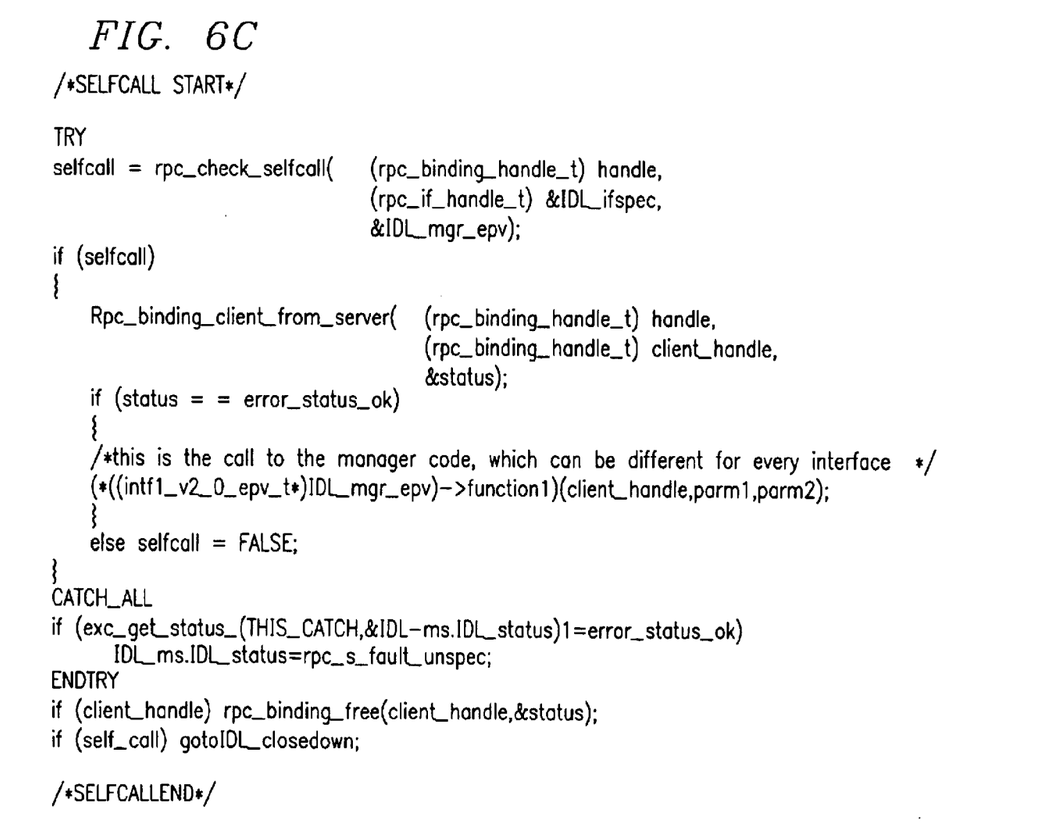
FIG. 6C is a set of source code statements that provide information about the changes that may be made to the client stub code to incorporate the selfcall mechanism of the present invention.

With reference now to FIG. 6C, a set of source code statements provides information about the changes that may be made to the client stub code to incorporate the selfcall mechanism of the present invention. The first call checks if the selfcall option has been specified, and if so, then the client stub attempts to implement the selfcall mechanism.

In addition to the changes to the IDL compiler and the client stub code, the following changes are made to the RPC runtime in order to implement the selfcall mechanism of the present invention. A first routine, named "rpc_check_selfcall", checks whether the RPC currently being processed call is directed to the same process that is making the RPC. It returns TRUE or FALSE, and if TRUE, it gets the address of the manager code. A second routine, named "rpc_binding_client_from_server", converts a client_side binding to a server_side binding, as shown in FIG. 6C. A third routine, named "rpc map exception to_status", converts an exception to a status code so it can be handled like a status code received from an RPC. A fourth routine, named "rpc_network_ep_match", is called by "rpc_check_selfcall" to see if the endpoint in a binding is one that is owned by this process. A fifth routine, named "rpc_network_resolve_binding", takes a partial binding which has an IP address but no endpoint and directly adds one of the endpoints owned by this process.

The function "rpc_check_selfcall" is called at the start of a client stub, as shown in FIG. 6C. Its purpose is to enable a client stub to determine whether a binding handle points to a server which is actually the same process in which the client stub is executing and return the local address of the manager routine to be called. When this routine returns TRUE, the client stub calls the manager routine directly (locally) does not make the remote procedure call. This saves the overhead RPC setup and other processing and avoids the use of additional executor threads.

A new "selfcall" flag has been added to the binding indicating whether the returned binding points to the same process that performs the function "rpc_check_selfcall" call. The flag's values are SELF, NOTSELF, and UNKNOWN. This flag is used in a manner such that the binding only has to be checked the first time it is used.

To determine if the manager code can be called directly, the function "rpc_check_selfcall" checks three things:

1) whether this process is a server process;
2) whether the binding points to this same process, i.e. whether the IP address matches one of the IP addresses on this machine, and whether the port number in the binding matches one of the port numbers owned by this process;
3) whether this interface/obj_uuid pair is registered in the interface registry for this process.

If one or more of these tests fail, this routine will return FALSE. No changes are made to the binding, other than to set the selfcall flag to NOTSELF if either IP address or protocol/endpoint did not match.

If all of these tests pass, the function will return a value of TRUE and pass an entry point vector back to the manager code so that the client stub can call the manager code directly. In the binding, the selfcall flag will be set to SELF and the bound_server_instance flag will be set to TRUE.

If the binding was a partial binding, so that there is no endpoint to be used for comparison, and the other tests pass, an endpoint must be copied into the binding to resolve it into a full binding.

RPC promises that all calls on a given handle bind to the same server instance. If a partial binding is passed in, the IP address matches, and the interface/obj_uuid match, the manager code could be called locally without resolving the partial binding. However, the partially bound binding could be resolved later to another server instance on this same machine, breaking the above promise. So the partial binding must be resolved into a fully bound binding before this routine returns TRUE.

Referring to the three checks performed by the function "rpc_check_selfcall", as listed above, it should be noted that interface/obj_uuid is not checked first because, even if that check failed, the check would be done repeatedly as that binding was used again, without ever setting the selfcall flag in the binding. The selfcall flag in the binding is used to return quickly from this routine for all calls after the first one when the call cannot be made locally.

An attempt should be made to set the selfcall flag to either SELF or NOTSELF. However, there is one case in which it is not attempted. If a partial binding is received, and the interface/obj_uuid do not match, then the binding is not completed and the flag cannot be set. The routine "rpc_check_selfcall" returns, and normal RPC processing is attempted to complete the binding. In this case, a full binding will be available the second time it is checked, and the selfcall flag can be set to NOTSELF.

Conclusion

The advantages of the present invention are apparent in view of the detailed description of the invention provided above. The present ;invention provides a short-circuiting scheme for RPCs. The technique automatically detects certain conditions and switches an RPC operation to a normal, local procedure call.

In summary, the switch between an RPC and a local procedure call occurs when the RPC service request is serviced by the same server from which the RPC request is actually issued, a frequent occurrence in the DCE security server and other core infrastructure servers in distributed systems. This optimization eliminates the overhead of parameter passing, including parameter marshalling/unmarshalling and transmitting over the transport media, which are involved in all distributed operations. In the case of authenticated RPCs in the DCE Security server, the overhead of authentication may also be eliminated since an RPC from the same process is already trusted. A secondary benefit of this technique is that it avoids a particular deadlock situation in the DCE security server—when the server is under a heavy load, at which time all of the RPC work threads are busy and waiting on requests to the same server, an additional RPC cannot be serviced because no more work threads are available. This problem is usually encountered when a server makes a call to a library routine that may call other library routines, and one of those library routines makes an RPC call to that same server.

In an exemplary implementation, the IDL compiler uses information about the nature of the procedure being called through RPC in order to generate client stub code that is able to switch from an RPC to a local procedure call. For a normal RPC, the IDL compiler uses an interface definition to generate code for the client stub and for the server stub. The present invention takes advantage of the fact that the IDL compiler can generate client stub code for calling a target procedure locally (when appropriate) in a manner similar to code in the server stub that would be generated by the IDL compiler for calling the target procedure in the server process during a standard RPC.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for calling a service procedure from a client process residing on a host computer in a distributed data processing system, the method comprising the steps of:
   in response to a remote procedure call (RPC) by the client process for the service procedure, detecting whether the service procedure is provided by the client process; and
   in response to a determination that the service procedure is provided by the client process, calling the service procedure using a local procedure call.

2. The method of claim 1 wherein the step of detecting whether the service procedure is provided by the client process further comprises:
   obtaining a binding handle of a server process for the service procedure;
   determining whether the binding handle of the server process points to the client process; and
   in response to a determination that the binding handle of the server process points to the client process, providing a positive indication that the service procedure is provided by the client process.

3. The method of claim 2 wherein the binding handle specifies a network address and a port number.

4. The method of claim 2 further comprising:
   converting the binding handle of the server process from a client-side binding to a server-side binding.

5. The method of claim 1 wherein the step of calling the service procedure further comprises:
   obtaining a local address for the function within the client process; and
   executing code for the service procedure at the local address.

6. The method of claim 5 wherein the step of obtaining the local address further comprises:
   looking up the service procedure in an interface registry.

7. The method of claim 1 further comprising:
   initiating the RPC;
   invoking a client stub for the service procedure; and
   passing parameters received by the client stub to the service procedure in the local procedure call.

8. The method of claim 7 wherein code for the client stub was compiled by an Interface Definition Language (IDL) compiler in accordance with predefined conditions.

9. The method of claim 7 wherein code for the client stub does not marshall and unmarshall the parameters.

10. The method of claim 1 wherein the RPC executes using a send and receive message facility of an operating system on the host computer.

11. A data processing system for calling a service procedure from a client process residing on a host computer in a distributed data processing system, the data processing system comprising:
   detecting means for detecting, in response to a remote procedure call (RPC) by the client process for the service procedure, whether the service procedure is provided by the client process; and
   calling means for calling, in response to a determination that the service procedure is provided by the client process, the service procedure using a local procedure call.

12. The data processing system of claim 11 wherein the detecting means further comprises:
   first obtaining means for obtaining a binding handle of a server process for the service procedure;
   determining means for determining whether the binding handle of the server process points to the client process; and
   providing means for providing, in response to a determination that the binding handle of the server process points to the client process, a positive indication that the service procedure is provided by the client process.

13. The data processing system of claim 12 wherein the binding handle specifies a network address and a port number.

14. The data processing system of claim 12 further comprising:
   converting means for converting the binding handle of the server process from a client-side binding to a server-side binding.

15. The data processing system of claim 11 wherein the calling means further comprises:
   second obtaining means for obtaining a local address for the function within the client process; and
   executing means for executing code for the service procedure at the local address.

16. The data processing system of claim 15 wherein the second obtaining means further comprises:
   lookup means for looking up the service procedure in an interface registry.

17. The data processing system of claim 11 further comprising:
   initiating means for initiating the RPC;
   invoking means for invoking a client stub for the service procedure; and
   passing means for passing parameters received by the client stub to the service procedure in the local procedure call.

18. The data processing system of claim 17 wherein code for the client stub was compiled by an Interface Definition Language (IDL) compiler in accordance with predefined conditions.

19. The data processing system of claim 17 wherein code for the client stub does not marshall and unmarshall the parameters.

20. The data processing system of claim 11 wherein the RPC executes using a send and receive message facility of an operating system on the host computer.

21. A computer program product in a computer-readable medium for use in a data processing system for calling a service procedure from a client process residing in the data processing system, the computer program product comprising the steps of:
   instructions for detecting, in response to a remote procedure call (RPC) by the client process for the service procedure, whether the service procedure is provided by the client process; and
   instructions for calling, in response to a determination that the service procedure is provided by the client process, the service procedure using a local procedure call.

22. The computer program product of claim 21 wherein the instructions for detecting whether the service procedure is provided by the client process further comprises:
   instructions for obtaining a binding handle of a server process for the service procedure;
   instructions for determining whether the binding handle of the server process points to the client process; and
   instructions for providing, in response to a determination that the binding handle of the server process points to the client process, a positive indication that the service procedure is provided by the client process.

23. The computer program product of claim 22 further comprising:
   instructions for converting the binding handle of the server process from a client-side binding to a server-side binding.

24. The computer program product of claim 21 wherein the instructions for calling the service procedure further comprises:
   instructions for obtaining a local address for the function within the client process; and
   instructions for executing code for the service procedure at the local address.

25. The computer program product of claim 24 wherein the instructions for obtaining the local address further comprises:
   instructions for looking up the service procedure in an interface registry.

26. The computer program product of claim 21 further comprising:
   instructions for initiating the RPC;
   instructions for invoking a client stub for the service procedure; and
   instructions for passing parameters received by the client stub to the service procedure in the local procedure call.

* * * * *